United States Patent
Noris et al.

(10) Patent No.: US 9,082,005 B2
(45) Date of Patent: Jul. 14, 2015

(54) SMART SCRIBBLES FOR SKETCH SEGMENTATION

(75) Inventors: Gioacchino Noris, Zurich (CH); Daniel Sykora, Kralupy n.V. (CZ); Ariel Shamir, Jerusalem (IL); Stelian Coros, Zurich (CH); Alexander Hornung, Zurich (CH); Robert Sumner, Zurich (CH); Maryann Simmons, Glendale, CA (US); Brian Whited, Glendale, CA (US); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 114 days.

(21) Appl. No.: 13/424,083

(22) Filed: Mar. 19, 2012

(65) Prior Publication Data
US 2013/0241934 A1 Sep. 19, 2013

(51) Int. Cl.
G06T 11/20 (2006.01)
G06K 9/00 (2006.01)
G06K 9/62 (2006.01)

(52) U.S. Cl.
CPC .......... *G06K 9/00416* (2013.01); *G06K 9/6224* (2013.01)

(58) Field of Classification Search
None
See application file for complete search history.

(56) References Cited

U.S. PATENT DOCUMENTS

| | | | | |
|---|---|---|---|---|
| 5,633,955 A | * | 5/1997 | Bozinovic et al. | 382/179 |
| 5,832,528 A | * | 11/1998 | Kwatinetz et al. | 715/272 |
| 7,227,993 B2 | * | 6/2007 | Xu | 382/179 |
| 8,200,014 B2 | * | 6/2012 | Wilensky et al. | 382/173 |
| 8,498,482 B2 | * | 7/2013 | Varekamp | 382/173 |
| 2004/0037463 A1 | * | 2/2004 | Calhoun et al. | 382/186 |
| 2005/0281467 A1 | * | 12/2005 | Stahovich | 382/202 |
| 2011/0293181 A1 | * | 12/2011 | Napper et al. | 382/187 |

OTHER PUBLICATIONS

Feng, et al "2D Cartoon Character Deformation by Sketch Skeleton" 2010 Third International Joint Conference on Computational Science and Optimization. IEEE Computer Society. 5 Pgs.
Patterson, et al "Computer Assisted Animation: 2D or Not 2D?" The Computer Journal, vol. 37, No. 10, 1994. 11 Pgs.
Wolin, et al "A Pen-based Tool for Efficient Labeling of 2D Sketches" EUROGRAPHICS Workshop on Sketch-Based Interfaces and Modeling (2007) M. van de Panne, E. Saund (Editors) 8 Pgs.

(Continued)

*Primary Examiner* — Joni Richer
*Assistant Examiner* — Yi Wang
(74) *Attorney, Agent, or Firm* — Farjami & Farjami LLP (57) ABSTRACT

A method is provided for sketch segmentation via smart scribbles, the results of which are especially suitable for interactive real-time graphics editing applications. A vector-based drawing may be segmented into labels based on input scribbles provided by a user. By organizing the labeling as an energy minimization problem, an approximate solution can be found using a sequence of binary graph cuts for an equivalent graph, providing an optimized implementation in a polynomial time suitable for real-time drawing applications. The energy function may include time, proximity, direction, and curvature between strokes as smoothness terms, and proximity, direction, and oriented curvature between strokes and scribbles as data terms. Additionally, the energy function may be modified to provide for user control over locality control, allowing the selection of appropriately sized labeling regions by scribble input speed or scribble input pressure. Once the drawing is labeled, a wide range of drawing applications are enabled.

17 Claims, 5 Drawing Sheets

(56) References Cited

OTHER PUBLICATIONS

Mao, et al "A Sketch-based approach to human body modeling" Computers & Graphics 33 (2009) pp. 521-541.

Herold, et al "SpeedSeg: A technique for segmenting pen strokes using pen speed" Computers & Graphics 35 (2011) pp. 250-264.

Sykora, et al "As-Rigid-As-Possible Image Registration for Hand-drawn Cartoon Animations" Proceedings of the 7th International Symposium on Non-Photorealistic Animation and Rendering. pp. 25-33.

Han, et al: "Coarse classification of Chinese characters via stroke clustering method" Pattern Recognition Letters 16 (1995). pp. 1079-1089.

Seah, et al "Computer-assisted coloring by matching line drawings" The Visual Computer, vol. 16, No. 5, 16 Pgs.

Grabli, et al "Density Measure for Line-Drawing Simplification" Proceedings of Pacific Graphics (2004) 10 Pgs.

Ghani, Dahlan Abdul "Wayang Kulit: Digital Puppetry Character Rigging Using Maya MEL Language" 4th International Conference on Modeling, Simulation and Applied Optimization (ICMSAO), 2011. 5 Pgs.

Shesh, et al "Efficient and Dynamic Simplification of Line Drawings" EUROGRAPHICS 2008, vol. 27, No. 2. 9 Pgs.

Saund, Eric "Finding Perceptually Closed Paths in Sketches and Drawings" IEEE Transactions on Pattern Analysis and Machine Intelligence, vol. 25, No. 4, Apr. 2003. pp. 475-491.

Saund, Eric "Finding Perceptually Salient Closed Paths in Sketches and Drawings" IEEE Transactions on Pattern Analysis and Machine Intelligence, vol. 34, No. 8, 2012. 5 Pgs.

Barla, et al "Geometric Clustering for Line Drawing Simplification" Proceedings of the Eurographics Symposium on Rendering—2005. 1 pg.

Saund, Eric "Identifying Salient Circular Arcs on Curves" Journal CVGIP: Image Understanding archive vol. 58, Issue 3, Nov. 1993 45 Pgs.

Kang, et al "Interactive Sketch Generation" The Visual Computer vol. 21, Nos. 8-10 (2005), 8 Pgs.

Baxter, et al "Latent Doodle Space" EUROGRAPHICS 2006, vol. 25, No. 3. 9 Pgs.

Saund, Eric "Labeling of Curvilinear Structure Across Scales by Token Grouping" IEEE Computer Society Conference on Computer Vision and Pattern Recognition, 1992. 30 Pgs.

Saund, Eric "Logic and MRF Circuitry for Labeling Occluding and Thinline Visual Contours" NIPS. 2006. [62] 8 Pgs.

Saund, et al "Minimizing Modes for Smart Selection in Sketching/Drawing Interfaces" Sketch-based Interfaces and Modeling 2011, Part 1. pp. 55-80.

Baxter, Bill "N-Way morphing for 2D animation" Computer Animation and Virtual Worlds (proc. CASA 2009), 2009. 24 Pgs.

Saund, et al "Perceptual Organization as a Foundation for Intelligent Sketch Editing" In AAAI Spring Symposium on Sketch Understanding, 2002. 8 Pgs.

Saund, et al "Perceptual Organization in an Interactive Sketch Editing Application" Proceeding ICCV '95 Proceedings of the Fifth International Conference on Computer Vision pp. 597-604.

Sarkar, et al "Perceptual Organization in Semantic Role Labeling" SDIUT 05 (Symposium on Document Image Understanding Technology) 6 Pgs.

Saund, et al "Perceptual Organization of Occluding Contours of Opaque Surfaces" Computer Vision and Image Understanding, vol. 76, No. 1, Oct. 1999. pp. 70-82.

Saund, et al "ScanScribe: Perceptually Supported Diagram Image Editing" Diagrams 2004—International Conference on the Theory and Applications of Diagrams. 4 Pgs.

Saund, et al "Perceptually-Supported Image Editing of Text and Graphics" Proc. UIST '03 (ACM Symposium on User Interface Software and Technology), 10 Pgs.

Lank, et al "Sloppy selection: Providing an accurate interpretation of imprecise selection gestures" Computer & Graphics 29 (2005) 11 Pgs.

Stahovich, Thomas F. "Segmentation of Pen Strokes Using Pen Speed" AAAI Fall Symposium Series 2004: Making Pen-Based Interaction Intelligent and Natural. 7 Pgs.

Zheng, et al "Sketching-Based Skeleton Generation" 3rd IEEE International Conference on Ubi-media Computing (U-Media), 2010. pp. 179-186.

Lank, et al "Sloppy Selection: Providing an Accurate Interpretation of Imprecise Selection Gestures" Computers and Graphics, Sepcial Issue on Pen Computing V. 29, No. 4, Aug. 2005, 7 Pgs.

Liu, et al "Stroke Correspondence Construction for Vector-based 2D Animation Inbetweening" 4 Pgs.

Saund, et al "Stylus Input and Editing Without Prior Selection of Mode" Proceedings of the 16th annual ACM symposium on User interface software and technology. 4 Pgs.

Saund, et al "PixLabeler: User Interface for Pixel-Level Labeling of Elements in Document Images" 10th International Conference on Document Analysis and Recognition, 2009. 5 Pgs.

* cited by examiner

Table 1

| Parameter | Value | Unit |
|---|---|---|
| $\lambda$ | 4 | |
| $\sigma_{prox\ smooth}$ | 100 | px |
| $\sigma_{dir\ smooth}$ | 0.5 | |
| $\sigma_{time\ smooth}$ | 1000 | ms |
| $\sigma_{curv\ smooth}$ | 0.5 | |
| $\sigma_{prox\ data}$ | 30 | px |
| $\sigma_{dir\ data}$ | 0.1 | |
| $\sigma_{curv\ data}$ | 0.25 | |
| $\omega$ | 0.5 | |
| $s_{min}$ | 0.07 | px/s |
| $s_{max}$ | 0.70 | px/s |
| *artboard width* | 1200 | px |
| *artboard heigth* | 1200 | px |

SMART SCRIBBLES FOR SKETCH SEGMENTATION

BACKGROUND

Sketched drawings can provide solid foundations for completed drawings and may even be used by themselves as stylized finished products. Since sketches can be completed in a relatively short time while providing a broad view of the most important visual elements, sketches are a valuable planning tool for artists, animators, modelers, engineers, draftsmen, and other professions that may produce paintings, figures, flowcharts, models, and other drawings and diagrams. Moreover, since sketching is a process that almost everyone is comfortable and familiar with, sketching may be advantageously employed by people at all artistic skill levels.

However, to transition from an initial rough sketch to an intermediate or finished drawing, it is essential to segment portions of the sketch into specific regions or layers. Once separated into layers, many tasks towards the completion of the drawing are readily solved or greatly assisted, including object occlusion, moving and deforming of parts, animation inbetweening or tweening, line or path stroking with color, and area shading with colors or patterns such as textures, hatching or screen tone. Conventionally, such layer segmentation is done manually by the user, often a time-consuming, tedious, and error-prone process, particularly for sketched drawings and for users unfamiliar with working with multiple drawing layers.

SUMMARY

The present disclosure is directed to smart scribbles for sketch segmentation, substantially as shown in and/or described in connection with at least one of the figures, as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
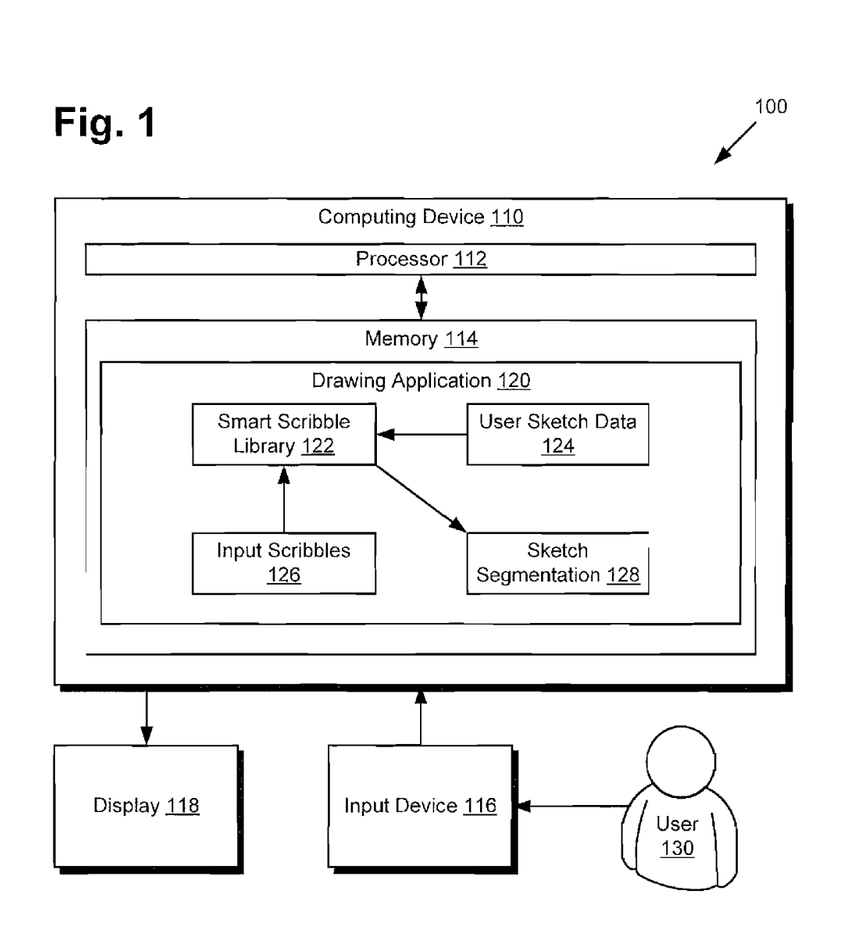
FIG. 1 presents an exemplary diagram of a system utilizing smart scribbles for sketch segmentation.

FIG. 1 presents an exemplary diagram of a system utilizing smart scribbles for sketch segmentation. Diagram 100 of FIG. 1 includes computing device 110, input device 116, display 118, and user 130. Computing device 110 includes hardware processor 112 and memory 114. Memory 114, which is a non-transitory storage device, includes drawing application 120. Drawing application 120 includes smart scribble library 122, user sketch data 124, input scribbles 126, and sketch segmentation 128.

FIG. 1 may illustrate a typical setup for an interactive drawing application providing sketch segmentation using user sketch data and input scribbles as smart scribbles, as further described below. Computing device 110 may include a personal computer, laptop, tablet computer, video game console, portable game system, mobile phone, or another device. Computing device 110 may include drawing application 120 stored in memory 114, which may be any interactive drawing application allowing user 130 to provide user sketch data 124 in a vector graphic format via input device 116. Input device 116 may include a pen tablet, a mouse, a touch screen, and/or any other input device.

While computing device 110, input device 116, and display 118 are shown as separate elements in diagram 100, some implementations may combine the elements in diagram 100. For example, display 118 and input device 116 may be the same device for a pen display or touch screen, which may further be combined with computing device 110 for an integrated tablet computer.

User sketch data 124 may be generated while user 130 interacts with drawing application 120. Thus, user sketch data 124 may include lines, curves, and other geometric primitives as user 130 draws them using input device 116. Each geometric primitive may also include time stamps to indicate time of creation or modification, along with stroke characteristics such as speed, pressure, direction and curvature. User sketch data 124 may be rendered as raster data for outputting to display 118, allowing user 130 to view user sketch data 124.

After user sketch data 124 is completed, it is desirable to generate sketch segmentation 128 to organize user sketch data 124 into specific regions or layers. As previously discussed, once user sketch data 124 is separated into layers by sketch segmentation 128, many tasks towards the completion of the drawing are readily solved or greatly assisted. Accordingly, user 130 or another user may provide input scribbles 126 to interactively generate sketch segmentation 128 from user sketch data 124 via smart scribble library 122, which may be a built-in feature or external plug-in of drawing application 120. Smart scribble library 122 may generate sketch segmentation 128 by organizing the above inputs into an energy minimization problem to be solved by a high-speed graph-cut optimization, as further discussed below.

The problem of assigning labels L, or sketch segmentation 128, to stroke segments in S, or user sketch data 124, based on scribble segments in R, or input scribbles 126, can be formulated as an energy minimization problem, or equation (1) below:

$$E(\phi) = \sum_{i,j \in S} V_{i,j}(\phi_i, \phi_j) + \lambda \sum_{i \in S} D_i(\phi_i) \quad (1)$$

wherein the goal is to find a labeling or assignment φ of the labels in L to every stroke segment in S that minimizes the energy function E, where $V_{i,j}$ is a smoothness term representing a cost with respect to a similarity between stroke segments i and j, where $D_i$ is a data term measuring the affinity between scribble segments and stroke segments, and where the parameter λ adjusts the relative weight of the smoothness and data terms.

The smoothness term of equation (1) may be defined more specifically as equation (2) below:

$$V_{i,j}(\phi_i, \phi_j) = \prod_{g \in G} \delta(g(i,j), \sigma_g) \quad (2)$$

when $\phi_i \neq \phi_j$, otherwise $V_{i,j}(\phi_i, \phi_j)=0$.

Figure 4A:
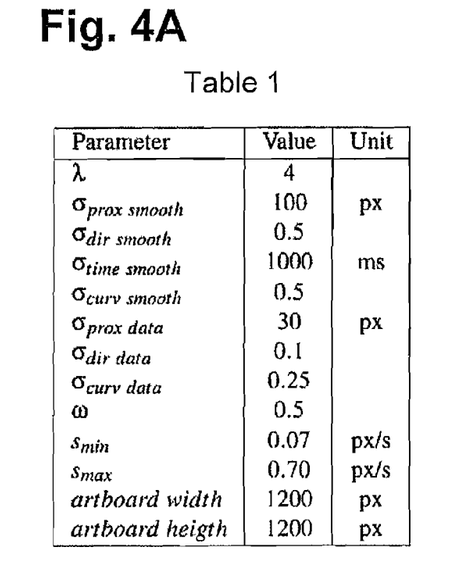
FIG. 4A presents a table showing exemplary parameters for energy minimization to derive sketch segmentation using smart scribbles.

G as used in equation (2) is a set of similarity terms including a proximity term, a direction term, a curvature term, and a time term:

$$\text{prox}(i,j) = \|\vec{p}_j - \vec{p}_i\|$$

$$\text{dir}(i,j) = 1 - |\vec{d}_i \cdot \vec{d}_j|$$

$$\text{curv}(i,j) = 1 - \min(c_i, c_j)/\max(c_i, c_j)$$

$$\text{time}(i,j) = |t_j - t_i|$$

where i and j represent two segments to be compared, p represents position, d represents direction, c represents radius of curvature, and t represents time of creation. The fall-off function δ in equation (2) is defined as equation (3) below:

$$\delta(g(i,j), \sigma_g) = \exp\left(-\frac{g(i,j)^2}{\sigma_g^2}\right) \quad (3)$$

where $\sigma_g$ represents an adjustment parameter for each similarity term, as discussed further in FIG. 4A below.

With regards to the similarity terms, the inclusion of proximity in the similarity terms leverages the intuitive idea that related strokes will be in close spatial proximity to each other. The inclusion of direction and curvature in the similarity terms effectively matches strokes with similar stroke direction and shape. The inclusion of time in the similarity terms takes advantage of temporal proximity during a typical sketch drawing process. For example, it is more likely that an artist will draw the details of each section separately and sequentially rather than jumping from section to section at random. Thus, strokes that are close in time may be more closely matched than those distant in time. The similarity terms provided above are only one example, and other implementations may also add or remove terms.

Moving to the data term of the energy function, the data term of equation (1) may be more specifically defined as equation (4) below:

$$D_i(\phi_i) = 1 - \max_{r \in R(\phi_i)} A(i, r) \quad (4)$$

where $R(\phi_i)$ denotes a set of scribble segments r with label $\phi_i$. Affinity $A(i, r)$ between a stroke segment i and a scribble segment r is defined as equation (5) below:

$$A(i, r) = \prod_{g \in G_{data}} \chi(i, r, g, \sigma_g) \quad (5)$$

As with the smoothness term, comparisons are between segments, rather than the original strokes or scribbles. However, since time information is not recorded for input scribbles 126, the set of similarity terms is reduced to $G_{data}=\{\text{prox, dir, curv}\} \subset G$. This is in line with user expectations, as the labeling result from an input scribble should be consistent regardless of the specific time when the user provides the input scribble. Additionally, curv may be redefined as an oriented curvature to differentiate between similar curve shapes with different orientations:

$$\text{curv}(i,j) = \|\vec{c}_i - \vec{c}_j\|$$

With regards to the data terms, the inclusion of proximity flows from the intuitive notion that the user will place the input scribble in close spatial proximity to the desired strokes to be labeled. The inclusion of direction and curvature matches input scribbles with strokes having similar stroke orientation and shape. However, as noted above, time is omitted from the data terms, as the inclusion of time would violate user expectations of consistent results regardless of input scribble creation time. Again, as with the similarity terms, the specific data terms may vary from the specific example provided above.

Figure 2A:
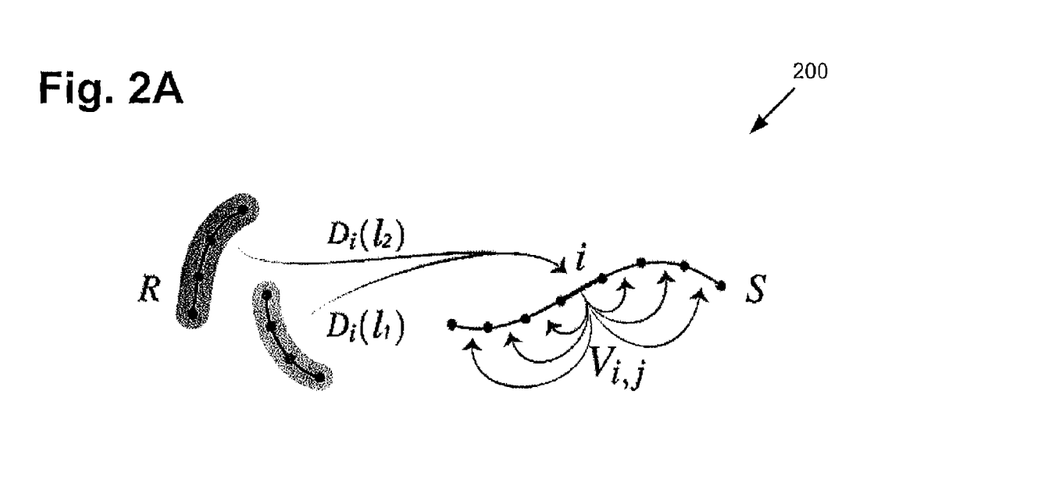
FIG. 2A presents exemplary stroke segments and smart scribbles illustrating energy minimization terms for sketch segmentation.

FIG. 2A presents exemplary stroke segments and smart scribbles illustrating energy minimization terms for sketch segmentation. Diagram 200 of FIG. 2A shows stroke S, scribbles R associated with a set of labels L including $l_1$ and $l_2$, smoothness terms $V_{i,j}$ between a stroke segment i and another stroke segment j, and data terms $D_i(l^*)$ including $D_i(l_1)$ and $D_i(l_2)$. With regards to FIG. 2A, stroke S may correspond to user sketch data 124 from FIG. 1, and scribble R may correspond to input scribbles 126 from FIG. 1. While only one stroke S and two scribbles R are shown in diagram 200 for simplicity, it is understood that any number of strokes S and scribbles R may be supported. For example, $V_{i,j}$ comparisons are not necessarily limited to the same stroke when multiple strokes S are available.

Each stroke S may form any arbitrarily complex path, and in some cases may overlap itself, cross over itself, or densely fill an area. Each scribble R may also be similarly complex. Accordingly, to keep processing manageable, each stroke S and scribble R may be resampled into smaller, approximately linear segments. For example, as shown in diagram 200, each scribble R is resampled into three (3) smaller scribble segments, and the stroke S is resampled into seven (7) smaller stroke segments including the middle segment i and the outer segments j. Locally defined properties of the larger scribbles or strokes may be readily transferred to the smaller segments during the resampling procedure.

With the energy minimization problem defined as above, a solution can be framed in terms of solving a multi-way cut on a specific graph, as described in the publication titled "Markov random fields with efficient approximations" (Boykov, et al. In *Proceedings of IEEE Conference on Computer Vision and Pattern Recognition* (1998), pp. 648-655), which is hereby incorporated fully into the present application by reference.

Figure 2B:
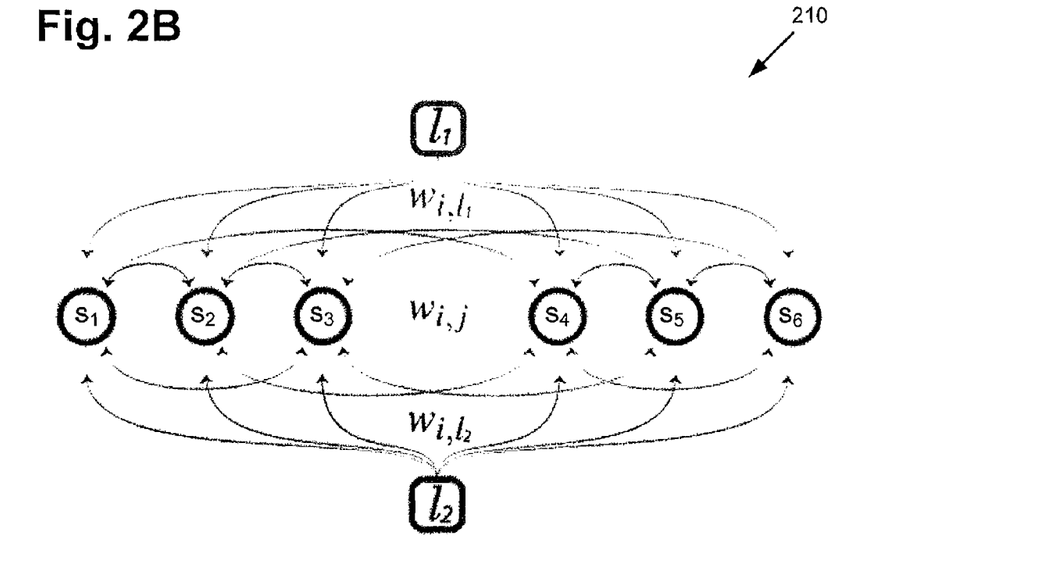
FIG. 2B presents an exemplary graph for solving energy minimization to derive sketch segmentation using smart scribbles.

Thus, FIG. 2B presents an exemplary graph for solving energy minimization to derive sketch segmentation using smart scribbles. Diagram 210 of FIG. 2B represents a weighted graph G={V, E}, where V={S, L} is a set of vertices consisting of stroke segments S ($s_1, s_2, s_3, s_4, s_5, s_6$) and label terminals L ($l_1, l_2$), and E={$E_s, E_l$} is a set of edges. $E_s$ refers to each stroke segment i∈S being connected to all other stroke segments j∈S−{i} via edges $E_{i,j}$ having weight $w_{i,j}$ equal to the smoothness term $V_{i,j}$. $E_l$ refers to auxiliary edges, $E_{i,l}$ connecting stroke segments i∈S to label terminals l∈L having weight $w_{i,l}$ equal to $\lambda(1-D_i(l))$, representing the data term.

Since the graph G in diagram 210 only has two terminals $l_1$ and $l_2$, the multi-way cut problem simplifies to a single max-flow or min-cut problem, for which efficient solutions exist in polynomial time, as known in the art. However, for N-terminal graphs where N>2, which will be the case when the user requires more than two segmentation labels, the problem becomes NP-hard. While advanced techniques such as a expansion and α/β swap are known for solving such graphs, implementations are quite costly and are therefore less suitable for interactive applications.

To provide an efficient solution suitable for real-time or near real-time interactive applications, N-terminal graphs can be simplified using a divide-and-conquer heuristic into a sequence of N−1 binary graph cut (max-flow or min-cut) problems, as described in the publication titled "LazyBrush: Flexible painting tool for hand-drawn cartoons" (Sykora, et al. *Computer Graphics Forum* 28, 2 (2009), 599-608), which is hereby incorporated fully into the present application by reference. The greedy multi-way cut algorithm utilized in LazyBrush provides an efficient optimization of the energy minimization problem in polynomial time, suitable for interactive applications such as graphics editing software. Thus, each of the stroke segments in S may be assigned a label in L within polynomial time, even when the number of terminals N is greater than 2.

Figure 3A:
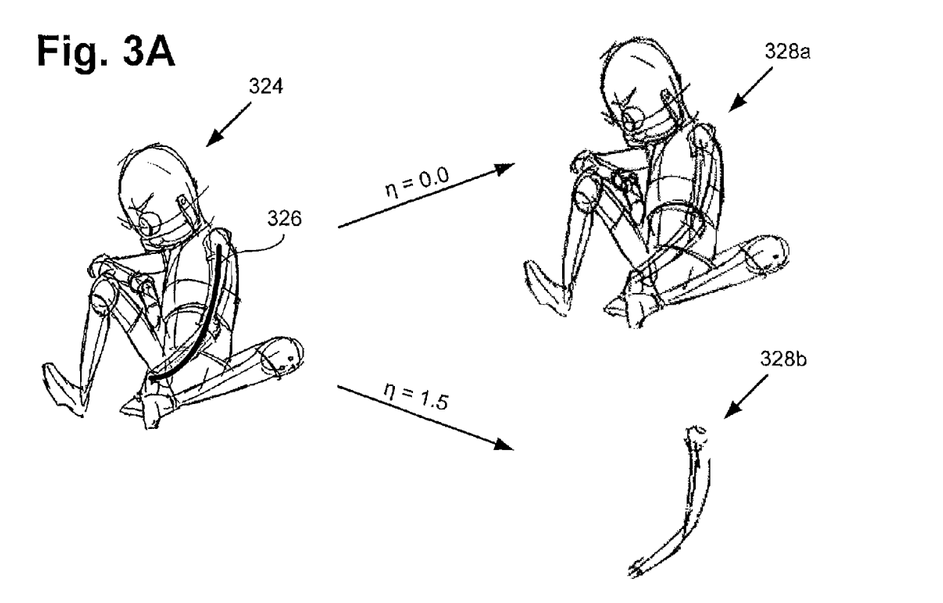
FIG. 3A presents exemplary results of sketch segmentation using smart scribbles with different levels of locality control.

Next, FIG. 3A presents exemplary results of sketch segmentation using smart scribbles with different levels of locality control. The term "locality control" refers to a parameter η for controlling sketch data selection locality of a corresponding user input scribble, as described in further detail below. In FIG. 3A, a user provides a completed user sketch data 324, and then desires to segment only the arm portion of the body. Accordingly, the user provides an input scribble 326 approximately where the arm is located in user sketch data 324, as shown. With a locality control of η=0.0, the result is sketch segmentation 328a where the entire body is labeled as selected, which is not the intention of the user. On the other hand, with a locality control of η=1.5, the result is sketch segmentation 328b, where only the arm portion is labeled as selected, as intended by the user. For visual clarity, unselected or background portions of user sketch data 324 are omitted from sketch segmentation 328b; however, such unselected portions may still be shown to user 130 on display 118 of FIG. 1.

To provide an artist-friendly user interface consistent with user expectations, it is thus desirable to provide a user defined level of locality control, thereby allowing the user to select only a smaller portion of the user sketch data, for example only the head area of a character sketch, or only a particular element of a diagram. If the fall-off function in equation (3) is used as-is without modifications, locality control η is equivalent to 0.0, resulting in sketch segmentation 328a for any first input scribble 326. Thus, a new fall-off function may be defined as equation (6) below:

$$\chi(i,r,g,\sigma_g)=\max(0,\gamma\cdot\delta^*(r,g,\sigma_g)) \quad (6)$$

where γ=1 if $\phi_r \neq b$ (i.e. the label of r is not b), else γ=−1. Fall-off function χ regulates the transfer of energy to a new background label b∈L, which represents unselected or background sketch segments. For each scribble segment r∈R a copy $r_b$ is also created, having the same properties of r but with a label b.

The function δ* of equation (6) is defined in equation (7) below:

$$\delta^*(r,g,\sigma_g)=(1+\eta(r))\cdot\delta(g,\sigma_g)-\eta(r)\cdot\delta(g,\sigma_g)^\omega \quad (7)$$

where ω is a parameter to adjust the energy transfer curve.

Figure 3B:
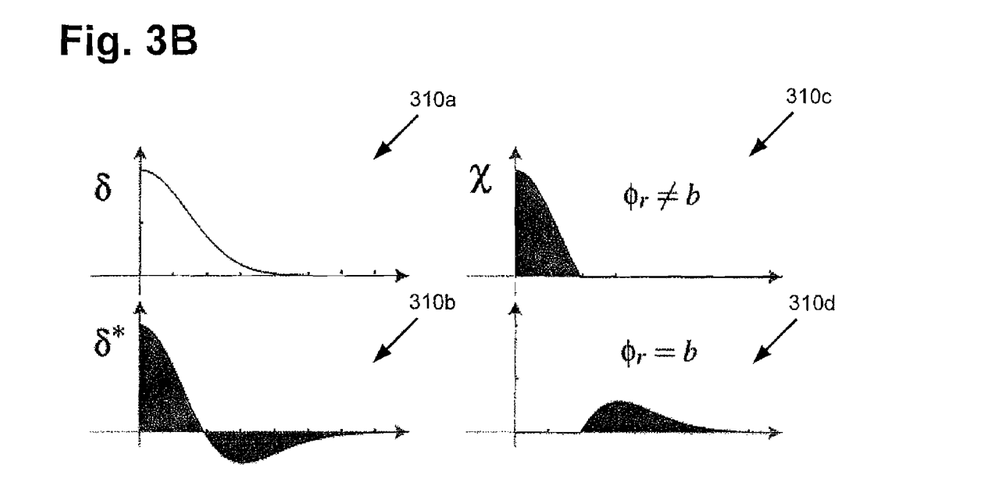
FIG. 3B presents exemplary graphs of energy fall-off functions to provide locality control in sketch segmentation using smart scribbles.

Moving to FIG. 3B, FIG. 3B presents exemplary graphs of energy fall-off functions to provide locality control in sketch segmentation using smart scribbles. With a locality control of η=0.0 in equation (7), the regular δ function in graph 310a is obtained. However, with a positive locality control, for example η=1.5 in equation (7), the negative component of δ* grows, as shown in graph 310b. Thus, using the new fall-off function χ in equation (6), some strokes are transferred to the user-defined label ($\phi_r \neq b$) in graph 310c, whereas a portion of strokes are transferred to the background label ($\phi_r = b$) in graph 310d, resulting in the desired labeling of sketch segmentation 328b in FIG. 3A.

To provide the user control of the locality control, the recorded input speed or input pressure of the associated input scribble 326 may be utilized to calculate η(r) in equation (8) below:

$$\eta(r) = \frac{3}{2}\left(1 - \sqrt{\frac{\text{speed}(r) - s_{min}}{s_{max} - s_{min}}}\right) \quad (8)$$

where speed(r) corresponds to the speed and/or pressure of the scribble segment, and $s_{min}$ and $s_{max}$ and are set to comfortable user operating ranges.

Thus, a faster speed or harder pressure for input scribble 326 results in decreased locality and a larger user label selection, whereas a slower speed or a lighter pressure for input scribble 326 results in increased locality and a smaller user label selection. Note that equation (8) is only provided as one working example for user control of locality control; any effective algorithm where η(r) depends on speed(r) may also be utilized.

Moving to FIG. 4A, FIG. 4A presents a table showing exemplary parameters for energy minimization to derive sketch segmentation using smart scribbles. Table 1 in FIG. 4A shows various example parameters for the equations discussed above and also utilized to obtain the example segmentation results shown in FIGS. 3A and 4B. The parameters in Table 1 may be adjusted according to the requirements and specifications of drawing application 120, user 130, display 118, input device 116, or for any other consideration.

Figure 4B:
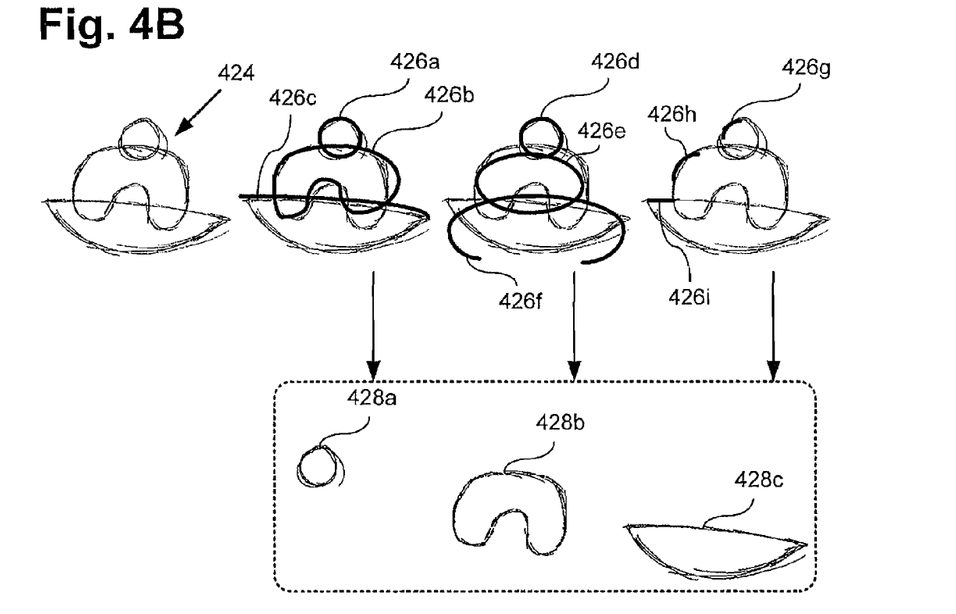
FIG. 4B presents an exemplary sketch having the same sketch segmentation results with various smart scribble sets.

Next, FIG. 4B presents an exemplary sketch having the same sketch segmentation results with various smart scribble sets. User sketch data 424 is subjected to three different sets of smart scribbles, which all result in the same sketch segmentation 428a, 428b, and 428c, corresponding to three user defined labels. For ease of visibility, sketch segmentations 428a, 428b, and 428c are shown staggered horizontally. The first set of input scribbles 426a, 426b, and 426c show scribbles that follow the sketch strokes quite closely. As expected, a correct segmentation into three distinct shapes is provided by sketch segmentations 428a, 428b, and 428c, respectively. The second set of input scribbles 426d, 426e, and 426f show scribbles that only approximate the general region of the desired sketch strokes by oval shapes. However, the smart scribble library 122 is resilient to such deviations due to the definition of the energy function in equation (3) including several factors besides just spatial proximity. Finally, the third set of input scribbles 426g, 426h, and 426i only indicate the desired labeling by very short scribbles.

Assuming that the shapes of user sketch 424 are each drawn at distinct time periods, the temporal proximity of the associated strokes may be utilized in equation (3) to help determine the correct labeling. Even if an incorrect labeling is provided, for example too small or too large, the user can simply provide additional input scribbles to refine the labeling by broadening or narrowing the selection as necessary.

FIG. 4B provides some examples of the flexibility of the smart scribbles, but only with a simple user sketch data 424. However, the smart scribbles can also provide excellent labeling results for more complicated drawings as well. Such results may be dependent on carefully selected parameters for Table 1 of FIG. 4A. While the selection of good parameters for Table 1 of FIG. 4A may take some effort to manually adjust, a labeling database of ground truth data may potentially be utilized to automatically tune the parameters of Table 1.

Figure 5:
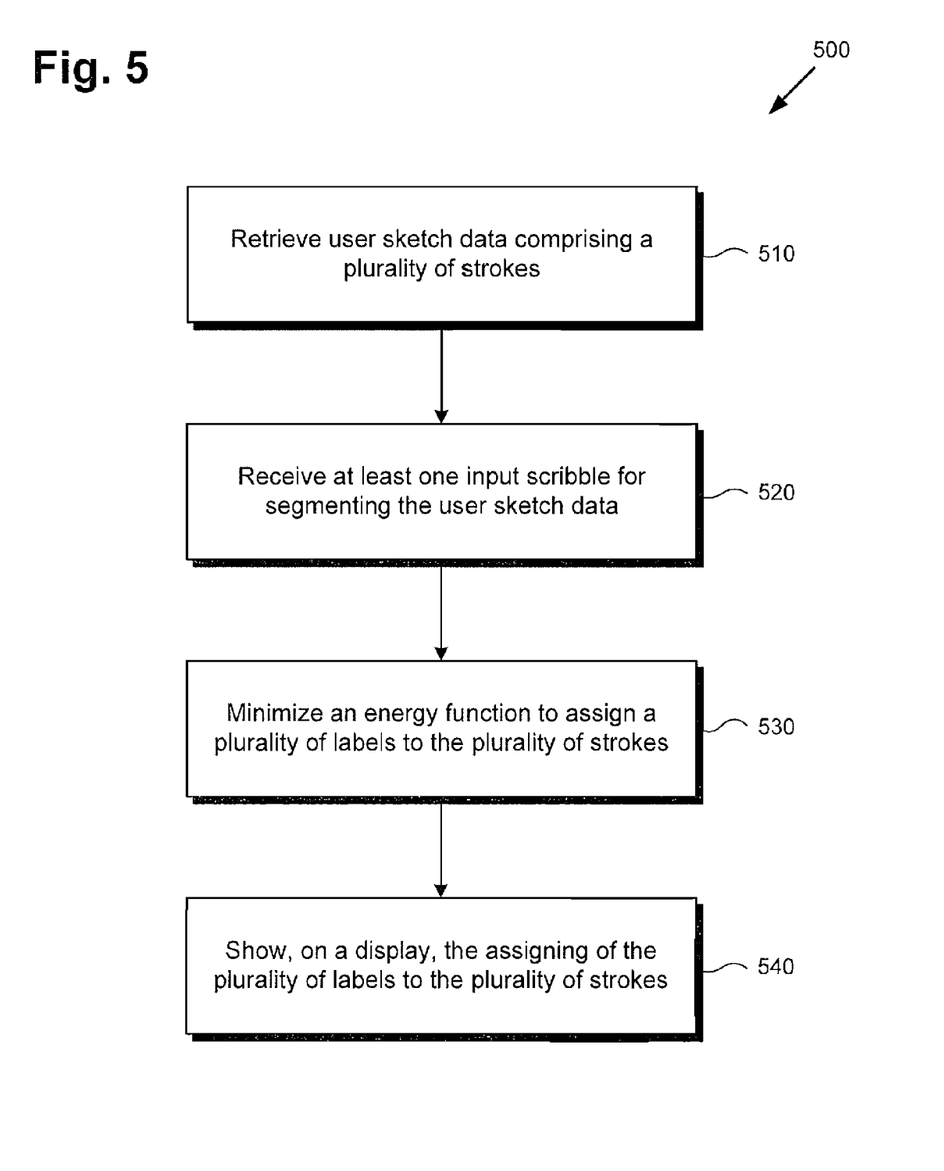
FIG. 5 presents an exemplary flowchart illustrating a method for providing sketch segmentation via smart scribbles.

FIG. 5 presents an exemplary flowchart illustrating a method for providing sketch segmentation via smart scribbles. Flowchart 500 begins when processor 112 of computing device 110 retrieves user sketch data 124 comprising a plurality of strokes (510). User sketch data 124 may be generated while user 130 uses input device 116 to create a sketch drawing. As previously discussed, user sketch data 124 may be stored in a vector format and may include lines, curves, and other geometric primitives along with time stamps and stroke characteristics.

Next, processor 112 of computing device 110 receives input scribbles 126 for segmenting user sketch data 124 (520). Thus, user 130 may provide one or more input scribbles 126 through input device 116 to guide the sketch segmentation process. Input scribbles 126 may be stored in a similar format as user sketch data 124, with the exception that time stamps may be omitted from input scribbles 126 as previously discussed. Further, as previously discussed, both user sketch data 124 and input scribbles 126 may be resampled into smaller segments for simplified processing. Note that it may not be the same user 130 that provides both user sketch data 124 and input scribbles 126. For example, user sketch data 124 may be recorded and provided by a different user from user 130.

Next, processor 112 of computing device 110 minimizes an energy function to assign a plurality of labels to the plurality of strokes (530). The energy function corresponds to equation (1) as described above, with a smoothness term and a data term described in equations (2) and (4) respectively. Further, the energy function may be modified to provide user controlled locality control, as described in FIGS. 3A and 3B. To minimize the energy function, the problem may be structured into a specific graph, as shown in FIG. 2B, which may be solved using the greedy multi-way cut algorithm of Lazy-Brush within polynomial time.

Next, processor 112 of computing device 110 shows, on display 118, the assigning of the plurality of labels to the plurality of strokes (540). For example, the strokes may be placed in layers according to their assigned label, colored or shaded according to their assigned label, or otherwise visually segmented within a user interface of drawing application 120 shown on display 118. From this point, user 130 may use the labeling indicated on display 118 to attain various goals using drawing application 120, including object occlusion, moving and deforming of parts, animation inbetweening or tweening, line or path stroking with color, area shading with colors or patterns such as textures, hatching or screen tone, and many other application goals.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for providing sketch segmentation via smart scribbles, the method comprising:
retrieving user sketch data comprising a plurality of strokes;
receiving at least one input scribble for segmenting the user sketch data;
minimizing an energy function for assigning at least one of a plurality of labels to the plurality of strokes, the energy function having:
a data term measuring an affinity between the plurality of strokes and the at least one input scribble, wherein the at least one input scribble includes a user-defined locality control parameter for controlling an amount of user sketch data selection, wherein the user-defined locality control parameter enables a single input scribble of the at least one input scribble to select more than one segment of the user sketch data; and
a smoothness term measuring a cost of selecting the at least one of the plurality of labels with respect to a similarity between two strokes within the plurality of strokes, wherein the smoothness term utilizes the user-defined locality control parameter to modify a fall-off function that determines which portions of the plurality of strokes are assigned to a background label;
assigning the at least one of the plurality of labels to the plurality of strokes, wherein the plurality of strokes have one or more overlaps; and
showing, on a display, the at least one of the plurality of labels assigned to the plurality of strokes.

2. The method of claim 1, wherein the minimizing of the energy function assigns a portion of the plurality of strokes to the background label based on an input speed or an input pressure of the at least one input scribble.

3. The method of claim 1, wherein the minimizing is by a plurality of binary graph cuts.

4. The method of claim 1, wherein the user sketch data and the at least one input scribble are resampled into smaller segments prior to the minimizing.

5. The method of claim 1, wherein the smoothness term includes at least one of a time term and a proximity term between the two strokes.

6. The method of claim 1, wherein the smoothness term includes a direction term and a curvature term between the two strokes.

7. The method of claim 1, wherein the data term includes a proximity term between the plurality of strokes and the at least one input scribble.

8. The method of claim 1, wherein the data term includes a direction term between the plurality of strokes and the at least one input scribble.

9. The method of claim 1, wherein the data term includes an oriented curvature term between the plurality of strokes and the at least one input scribble.

10. A computing device providing sketch segmentation via smart scribbles, the computing device including a processor configured to:
retrieve user sketch data comprising a plurality of strokes;
receive at least one input scribble for segmenting the user sketch data;
minimize an energy function for assigning at least one of a plurality of labels to the plurality of strokes, the energy function having:
a data term measuring an affinity between the plurality of strokes and the at least one input scribble, wherein the at least one input scribble includes a user-defined locality control parameter for controlling sketch data selection, wherein the user-defined locality control parameter enables a single input scribble of the at least one input scribble to select more than one segment of the user sketch data; and
a smoothness term measuring a cost of selecting the at least one of the plurality of labels with respect to a similarity between two strokes within the plurality of strokes, wherein the smoothness term utilizes the user-defined locality control parameter to modify a fall-off function that determines which portions of the plurality of strokes are assigned to a background label;
assign the at least one of the plurality of labels to the plurality of strokes, wherein the plurality of strokes have one or more overlaps; and
show, on a display, the of at least one of the plurality of labels assigned to the plurality of strokes.

11. The computing device of claim 10, wherein the processor is configured to minimize the energy function to assign a portion of the plurality of strokes to the background label based on an input speed or an input pressure of the at least one input scribble.

12. The computing device of claim 10, wherein prior to the minimizing the processor is configured to resample the user sketch data and the at least one input scribble into smaller segments.

13. The computing device of claim 10, wherein the smoothness term includes a time term, a proximity term, a direction term, and a curvature term between the two strokes.

14. The computing device of claim 10, wherein the data term includes a proximity term, a direction term, and an oriented curvature term between the plurality of strokes and the at least one input scribble.

15. A system for providing sketch segmentation via smart scribbles, the system comprising:
a display;
an input device;
a computing device having a processor configured to:
retrieve, from the input device, user sketch data comprising a plurality of strokes;
receive, from the input device, at least one input scribble for segmenting the user sketch data;
minimize an energy function for assigning at least one of a plurality of labels to the plurality of strokes, the energy function having:
a data term measuring an affinity between the plurality of strokes and the at least one input scribble, wherein the at least one input scribble includes a user-defined locality control parameter for controlling sketch data selection, wherein the user-defined locality control parameter enables a single input scribble of the at least one input scribble to select more than one segment of the user sketch data; and
a smoothness term measuring a cost of selecting the at least one of the plurality of labels with respect to a similarity between two strokes within the plurality of strokes, wherein the smoothness term utilizes the user-defined locality control parameter to modify a fall-off function that determines which portions of the plurality of strokes are assigned to a background label;
assign the at least one of the plurality of labels to the plurality of strokes, wherein the plurality of strokes have one or more overlaps; and
show, on the display, the of at least one of the plurality of labels assigned to the plurality of strokes.

16. The system of claim 15, wherein the smoothness term includes a time term, a proximity term, a direction term, and a curvature term between the two strokes.

17. The system of claim 15, wherein the data term includes a proximity term, a direction term, and an oriented curvature term between the plurality of strokes and the at least one input scribble.

* * * * *